United States Patent
Kaga et al.

(10) Patent No.: US 10,642,070 B2
(45) Date of Patent: *May 5, 2020

(54) PROGRESSIVE ADDITION LENS

(71) Applicants: HOYA LENS THAILAND LTD., Thanyaburi, Patumthani (TH); Tadashi Kaga, Tokyo (JP); Toshihide Shinohara, Tokyo (JP); Ayumu Ito, Tokyo (JP); Hiroshi Asami, Tokyo (JP)

(72) Inventors: Tadashi Kaga, Tokyo (JP); Toshihide Shinohara, Tokyo (JP); Ayumu Ito, Tokyo (JP); Hiroshi Asami, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 0 days.

This patent is subject to a terminal disclaimer.

(21) Appl. No.: 15/311,358

(22) PCT Filed: Jun. 3, 2015

(86) PCT No.: PCT/JP2015/066109
§ 371 (c)(1),
(2) Date: Nov. 15, 2016

(87) PCT Pub. No.: WO2015/186766
PCT Pub. Date: Dec. 10, 2015

(65) Prior Publication Data
US 2017/0115510 A1    Apr. 27, 2017

(30) Foreign Application Priority Data
Jun. 4, 2014    (JP) ................. 2014-116284

(51) Int. Cl.
*G02C 7/06* (2006.01)

(52) U.S. Cl.
CPC ............. *G02C 7/068* (2013.01); *G02C 7/06* (2013.01); *G02C 7/066* (2013.01)

(58) Field of Classification Search
CPC ......... G02C 7/063; G02C 7/066; G02C 7/068
(Continued)

(56) References Cited

U.S. PATENT DOCUMENTS

| 4,580,883 A * | 4/1986 | Shinohara | G02C 7/065 351/159.42 |
| 4,762,408 A * | 8/1988 | Shinohara | G02C 7/061 351/159.42 |

(Continued)

FOREIGN PATENT DOCUMENTS

| JP | 3852116 B2 | 11/2006 |
| JP | 2009-511962 A | 3/2009 |

(Continued)

OTHER PUBLICATIONS

Dec. 15, 2016 International Preliminary Report on Patentability issued in International Patent Application No. PCT/JP2015/066109.
(Continued)

*Primary Examiner* — Nicholas R. Pasko
(74) *Attorney, Agent, or Firm* — Oliff PLC

(57) ABSTRACT

Progressive addition lens includes a near portion having a power for viewing a near field, a distance portion having a power for viewing a distance field further than the near field, and an intermediate portion connecting the distance portion and the near portion. The progressive addition lens includes an aspherical object-side surface and an aspherical eyeball-side surface and is formed in rotational symmetry with respect to a center of design of the progressive addition lens. The object-side surface includes a first stable region formed in rotational symmetry with respect to the center of design and including the center of design, and an aspherical region arranged outside of the first stable region to contact the first stable region and formed in rotational symmetry with respect to the center of design. A Peak to Valley value of a (Continued)

mean surface refractive power in the first stable region is 0.12 D or less.

8 Claims, 11 Drawing Sheets

(58) Field of Classification Search
USPC .............. 351/159.06, 159.1, 159.11, 159.12, 351/159.13, 159.14, 159.15
See application file for complete search history.

(56) References Cited

U.S. PATENT DOCUMENTS

| | | | | |
|---|---|---|---|---|
| 4,786,160 | A * | 11/1988 | Furter | G02C 7/061 351/159.42 |
| 4,796,988 | A * | 1/1989 | Dufour | G02C 7/061 351/159.42 |
| 4,976,534 | A * | 12/1990 | Miege | A61F 2/145 351/159.42 |
| 5,574,518 | A * | 11/1996 | Mercure | G02C 7/027 351/159.47 |
| 5,719,657 | A * | 2/1998 | Izawa | G02C 7/061 351/159.42 |
| 5,867,246 | A * | 2/1999 | Edwards | G02C 7/061 351/159.42 |
| 6,019,470 | A | 2/2000 | Mukaiyama et al. | |
| 6,030,077 | A * | 2/2000 | Sawano | A61F 2/1618 351/159.42 |
| 6,186,627 | B1 * | 2/2001 | Obara | G02C 7/061 351/159.42 |
| 6,260,966 | B1 * | 7/2001 | Sawano | A61F 2/1618 351/159.43 |
| 6,357,876 | B1 * | 3/2002 | Oyama | G02C 7/042 351/159.41 |
| 6,457,826 | B1 * | 10/2002 | Lett | A61F 2/1618 351/159.05 |
| 6,776,486 | B2 * | 8/2004 | Steele | G02C 7/024 351/159.42 |
| 7,370,962 | B2 * | 5/2008 | Roffman | G02C 7/042 351/159.41 |
| 7,806,526 | B2 * | 10/2010 | Bourdoncle | G02C 7/061 351/159.42 |
| 8,007,102 | B2 * | 8/2011 | De Gaudemaris | G02C 7/02 351/159.41 |
| 8,684,522 | B2 * | 4/2014 | Kato | G02C 7/068 351/159.42 |
| 2005/0099596 | A1 | 5/2005 | Kato | |
| 2009/0257026 | A1 * | 10/2009 | Varnas | G02C 7/063 351/159.5 |
| 2010/0201941 | A1 * | 8/2010 | Gupta | G02C 7/061 351/159.42 |
| 2011/0037944 | A1 | 2/2011 | Varnas | |
| 2012/0019775 | A1 * | 1/2012 | Tyrin | A61H 5/00 351/203 |
| 2012/0200822 | A1 * | 8/2012 | Kaga | G02C 7/061 351/159.42 |
| 2012/0274893 | A1 | 11/2012 | Wada et al. | |
| 2013/0083288 | A1 * | 4/2013 | Shinohara | G02C 7/02 351/159.42 |
| 2014/0055742 | A1 | 2/2014 | Shinohara et al. | |
| 2015/0055083 | A1 | 2/2015 | Mori et al. | |
| 2017/0082870 | A1 * | 3/2017 | Kaga | G02C 7/06 |

FOREIGN PATENT DOCUMENTS

| | | |
|---|---|---|
| JP | 2011-501222 A | 1/2011 |
| JP | 2012-173595 A | 9/2012 |
| JP | 2012-233959 A | 11/2012 |
| JP | 2013-076850 A | 4/2013 |
| JP | 2016-525221 A | 8/2016 |
| WO | 2004/034131 A1 | 4/2004 |
| WO | 2011/030673 A1 | 3/2011 |
| WO | 2013/151165 A1 | 10/2013 |
| WO | 2015/186767 A1 | 12/2015 |

OTHER PUBLICATIONS

Jan. 15, 2018 Search Report Issued in European Patent Application No. 15802814.2.
Translation of Nov. 16, 2017 Office Action issued in Japanese Patent Application No. 2016-525220.
Aug. 4, 2015 International Search Report issued in International Patent Application No. PCT/JP2015/066109.
Sep. 4, 2018 Office Action issued in Chinese Patent Application No. 201580029658.8.

* cited by examiner (a)

CONSTANT POWER (b)

DISTANCE PORTION (SMALL POWER)

INTERMEDIATE PORTION (POWER CHANGING)

NEAR PORTION (LARGE POWER)

PROGRESSIVE ADDITION LENS

TECHNICAL FIELD

The present invention relates to a progressive addition lens.

BACKGROUND ART

A progressive addition lens which is used as a glasses lens for correction for presbyopia of a user's vision has been developed. For example, a progressive addition power lens has a region (distance portion), which has a refractive power for viewing a distance field, arranged between an upper part and a center part of the lens, a region (near portion), which has a refractive power for viewing a near field, arranged at a lower part of the lens, and a region (intermediate portion) which smoothly connects the distance portion and the near portion each of which has different refractive power. In the intermediate portion, the refractive power is continuously changed from the refractive power of the distance portion to the refractive power of the near portion.

By using such a progressive addition lens as a glasses lens, a state of difficulty in focusing on the near field due to the presbyopia is improved. Further, when a vision line is moved between the distance field and the near field, such a configuration makes it possible to move the vision line with less incongruous across a wide range between the distance field and the near field.

However, in the progressive addition lens, since different regions having different refractive powers are arranged on a single lens, when a user sees an object through the lens, a jumping and a warping of images of the object is generated and therefore comfortableness in use is deteriorated. A progressive addition lens which improves such a jumping and a warping of images is disclosed for example in Patent Literature 1.

In Patent Literature 1, a surface refractive power in a horizontal direction of the lens is larger than a surface refractive power in a vertical direction in an object-side surface of the progressive addition lens. With such a configuration, a fluctuation of angle of the vision line passing through the lens is suppressed when the vision line is moved in the horizontal direction. As a result, various aberrations of the object seen through the lens are reduced and the jumping of images is improved.

Further, a progressive addition lens which reduces the jumping and the warping of images is disclosed for example in Patent Literature 2.

In Patent Literature 2, an arrangement of a lens surface of the progressive addition lens is focused. Conventionally, a progressive refractive surface having a progressive refractive effect is arranged on the object-side surface (outer surface), however in Patent Literature 2, a so-called inner surface progressive addition lens is disclosed in which the progressive refractive surface is arranged on the eyeball-side surface and the object-side surface is formed in a spherical surface.

In the inner surface progressive addition lens, by providing a progressive refractive surface (a surface in which a curvature is changed) in which regions having different refractive powers (distance portion and near portion) are formed as an inner surface and providing a surface (a surface in which a curvature is constant) in which a region having a constant refractive power is formed as the object-side surface, "shape factor" which is one of factors determining a magnification of the glasses lens is set to be constant and therefore magnification difference generated in the glasses lens can be reduced.

Specifically, in a lens 100 shown in FIG. 11, the magnification of the glasses lens (S. M.) is represented by a Formula 1 by using a shape factor (Ms) and a power factor (Mp) as below.

$$S.M. = Ms \cdot Mp \qquad \text{Formula 1}$$

Further, the Ms is represented by a Formula 2 and the Mp is represented by a Formula 3 as below.

[Mathematical Formula 1]

$$Ms = \frac{1}{1 - \frac{D1 \cdot t}{n}} \qquad \text{Formula 2}$$

[Mathematical Formula 2]

$$Mp = \frac{1}{1 - L \cdot P} \qquad \text{Formula 3}$$

Here, D1 denotes a base curve of an object-side surface 200, t denotes a thickness of the lens center, n denotes a refractive index of the lens, L denotes a distance between an apex (inner apex) of an eyeball-side surface 300 and an eyeball E (specifically, a corneal apex), and P denotes a power at the inner apex.

It is obvious from the Formula 1 that the magnification of the glasses lens is changed in accordance with the shape factor and the power factor.

Here, in the Formula 2, the D1 in the shape factor is the base curve of the object-side surface, and when the progressive refractive surface is provided as the object-side surface, since the refractive power or the base curve in the distance portion and that in the near portion are different, the D1 is not to be constant and therefore the D1 is fluctuated. Accordingly, the shape factor is fluctuated.

Further, in the power factor, since the P shown in the Formula 3 is unambiguously determined by the power (distance power, near power, addition power and the like) added to the lens, the P cannot be set freely.

However, as disclosed in Patent Literature 2, by providing the progressive refractive surface as the eyeball-side surface and forming the object-side surface in the spherical surface, the base curve is not changed but is to be constant. Accordingly, by setting the shape factor to be constant by forming the object-side surface in the spherical surface, the fluctuation of the magnification due to the shape factor disappears with respect to the difference of the magnification of the glasses lens (S. M.), and therefore the difference of the magnification can be reduced.

CITATION LIST

Patent Literature

Patent Literature 1: JP 2013-76850 A
Patent Literature 2: JP 3852116 B1

SUMMARY OF INVENTION

Technical Problem

However, in the progressive addition lens disclosed in Patent Literature 1, the object-side surface is formed such that the curvature in the vertical direction is different from the curvature in the horizontal direction, and the progressive element having the progressive refractive effect is arranged on the eyeball-side surface. Such a progressive addition lens is so-called both-sided progressive addition lens, and it is known that its processing and manufacturing are difficult.

Specifically, in the object-side surface, since the curvature in the horizontal direction is larger than the curvature in the vertical direction, a normal block lens for fixing the lens to a lens holder cannot be used in grinding or polishing of the lens, and therefore forming a special block ring is necessary.

Further, when the lens is fixed by using the special block lens, since after performing processing while fixing one surface, processing is performed while fixing another surface, a rotational deviation in which a fixing position of another surface with respect to a fixing position of one surface is rotationally deviated from a designed position in a clockwise direction or in a counterclockwise direction may be generated in fixing the lens to the lens holder. In the both-sided progressive addition lens disclosed in Patent Literature 1, since the progressive element is set to both of the object-side surface and the eyeball-side surface, when the rotational deviation is generated, positional accuracy of a combination of the progressive element of one surface and the progressive element of another surface is deteriorated. As a result, in a processed final lens, the object-side surface and the eyeball-side surface are combined differently from the designed configuration, and therefore an actual refractive power distribution is different from a designed refractive power distribution. Especially, when the rotational deviation of the lens surface to which a power of the correction for astigmatism is added is generated, since not only a power deviation but also a deviation of an astigmatism axis become larger, an optical property of the final lens is deteriorated.

Further, in the inner surface progressive addition lens disclosed in Patent Literature 2, the jumping and the warping of images can be reduced compared to an outer surface compressive power lens in which the progressive refractive surface is arranged on the object-side surface. However, in Patent Literature 2, only the change of magnification caused by the shape factor is improved. Thus, for example, in a case in which a progressive addition lens is designed based on a prescription in which power difference between the power of the distance portion and the power of the near portion is large, magnification difference between the distance portion and the near portion becomes larger due to the power difference between the distance portion and the near portion, and therefore reduction of the jumping and the warping of images is insufficient.

Further, in Patent Literature 2, an aspect ratio of images is not considered at all. The aspect ratio denotes a ratio of a vertical length and a horizontal length of the image when seen through the lens. When the aspect ratio is 1, the ratio of the vertical length and the horizontal length of the object seen through the lens is the same as the ratio of the vertical length and the horizontal length, and therefore a less incongruous and comfortable field of vision can be obtained. Accordingly, it is important to consider the aspect ratio in designing the progressive addition lens.

However, in the progressive addition lens disclosed in Patent Literature 2, since the object-side surface is formed in a spherical surface, when the object is seen through a lower part of the lens for presbyopia, the image of the object is expanded in the vertical direction due to the characteristic of the spherical surface compared to when the object is seen through a center part of the lens. In a case in which the lens is subjected to lens shape processing and formed in a glasses lens, generally, the distance portion of the glasses lens corresponds to a part between an upper part and a center part of the progressive addition lens, and the near portion corresponds to a lower part of the progressive addition lens. Accordingly, when the progressive addition lens disclosed in Patent Literature 2 is used for the glasses lens, the image seen through the near portion is expanded in the vertical direction compared to the image seen through the distance portion, and therefore the aspect ratio of images in the near portion is deteriorated.

The present invention is taking the problem described above into consideration and an object of the present invention is to provide a progressive addition lens capable of maintaining an optical property of the lens by improving positional accuracy of relative combination of an object-side surface and an eyeball-side surface, and capable of improving an aspect ratio of images in a near portion.

Solution to Problem

According to a first aspect of the present invention, there is provided a progressive addition lens including:

a near portion having a power for viewing a near field;

a distance portion having a power for viewing a distance field further than the near field; and an intermediate portion connecting the distance portion and the near portion, wherein the progressive addition lens includes an aspherical object-side surface and an aspherical eyeball-side surface, the object-side surface is formed in rotational symmetry with respect to a center of design of the progressive addition lens, the object-side surface includes a first stable region formed in rotational symmetry with respect to the center of design and including the center of design, and an aspherical region arranged outside of the first stable region so as to contact the first stable region and formed in rotational symmetry with respect to the center of design, and a PV value (Peak to Valley) of a mean surface refractive power in the first stable region is 0.12 D or less.

In the first aspect, it is preferable that the rotation symmetrical aspherical region includes a curvature changing region in contact with an outside of the first stable region and satisfying the following Condition 1.

Condition 1

A curvature in a meridional direction from the center of design toward an outer periphery of the object-side surface is smaller than a curvature in the meridional direction in the first stable region.

In the first aspect, it is preferable that one of the curvature in the meridional direction and the curvature in the sagittal direction in the curvature changing region is asymptotically reduced toward the meridional direction.

In the first aspect, it is preferable that the curvature in the meridional direction is smaller than the curvature in the sagittal direction in the curvature changing region.

In the first aspect, it is preferable that the rotation symmetrical aspherical region has a second stable region arranged outside of the curvature changing region so as to contact the curvature changing region and formed in rotational symmetry with respect to a center of design, and in the second stable region, the curvature in the meridional direction is smaller than the curvature in the sagittal direction. Further, it is preferable that the curvature in the meridional direction is substantially constant. It is preferable that a PV value (Peak to Valley) of surface refractive power in the meridional direction in the second stable region is 0.25 D or less.

In the first aspect, it is preferable that a distance power measuring point is arranged in the first stable region. In this case, it is preferable that a near power measuring point is arranged in the curvature changing region or the second stable region.

In the first aspect, it is preferable that a near power measuring point is arranged in the first stable region. In this case, it is preferable that a distance power measuring point is arranged in the curvature changing region or the second stable region.

In the first aspect, it is preferable that the eyeball-side surface includes a surface refractive power change which cancels a change of a surface refractive power due to the curvature changing region of the object-side surface.

Advantageous Effects of Invention

According to the present invention, the progressive addition lens capable of maintaining the optical property of the lens by improving the positional accuracy of the relative combination of the object-side surface and the eyeball-side surface and capable of improving the jumping and the warping of images and the aspect ratio of images in the near portion when seen through the lens can be provided.

DESCRIPTION OF EMBODIMENTS

Figure 1:
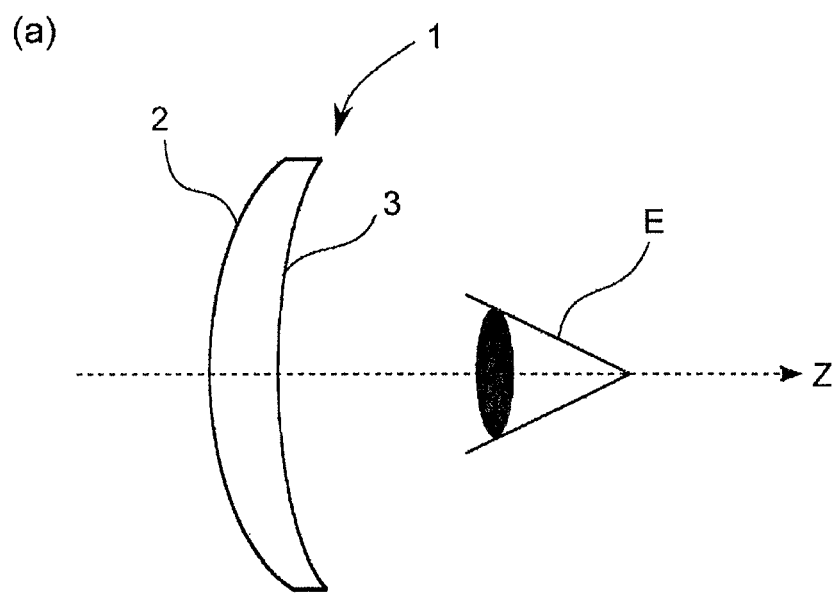
FIG. 1A is a schematic sectional view of a progressive addition lens according to a present embodiment.
FIG. 1B shows an example of an arrangement of a distance portion, a near portion and an intermediate portion of the progressive addition lens according to the present embodiment.
Figure 1:
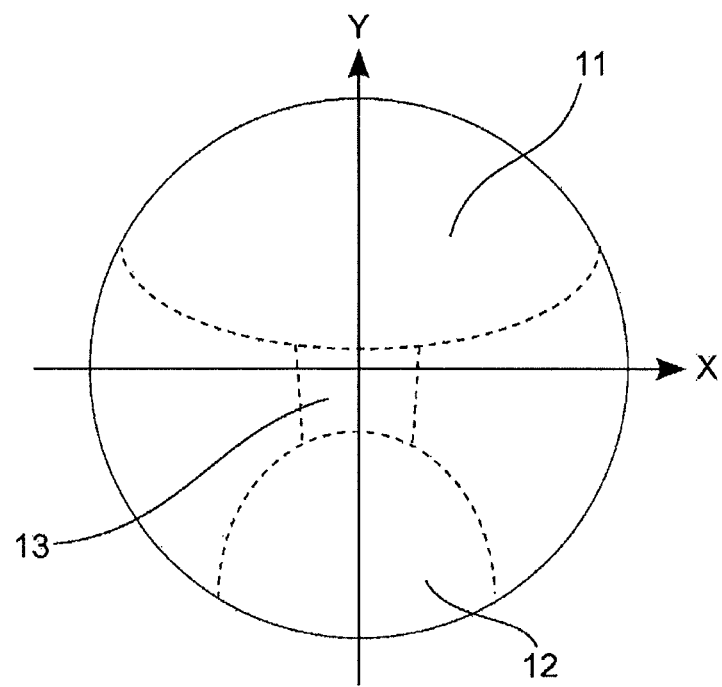

Hereinafter, the present invention is described in detail in the following order based on an embodiment shown in drawings.

1. Progressive addition lens
  1-1 Object-side surface
    1-1-1 First stable region
    1-1-2 Curvature changing region
    1-1-3 Second stable region
  1-2 Eyeball-side surface
  1-3 Combination of the object-side surface and the eyeball-side surface
2. Method of manufacturing the progressive addition lens
3. Effects of the present embodiment
4. Modified example 1. Progressive Addition Lens A progressive addition lens 1 according to the present embodiment is, as shown in FIG. 1A, provided with a surface located at a side of an object (object-side surface 2) and a surface located at a side of an eyeball E (eyeball-side surface 3). FIG. 1B shows an arrangement of a distance portion, a near portion and an intermediate portion of the progressive addition lens 1 according to the present embodiment. In the present embodiment, a progressive element having a progressive refractive effect leading a function of a distance portion and the like shown in FIG. 1B is arranged on both of the object-side surface and the eyeball-side surface. The progressive addition lens 1 is provided as a both-sided progressive addition lens.

As shown in FIG. 1B, the progressive addition lens 1 according to the present embodiment has a distance portion 11 and a near portion 12 having different refractive powers to each other, and further has an intermediate portion 13 smoothly connecting the distance portion 11 and the near portion 12 and having a refractive power continuously changing. The progressive addition lens 1 is provided as a progressive addition lens for presbyopia or myopia having the power of the distance portion 11 set to a plus value or 0.

When the progressive addition lens 1 according to the present embodiment is used for a glasses lens, light transmitting through the progressive addition lens 1 makes an image in accordance with a refractive power distribution set in the distance portion and the like shown in FIG. 1B, and then the image is finally formed on a retina of the eyeball E. Accordingly, FIG. 1B schematically shows the refractive power distribution of the lens 1 in which the object-side surface 2 and the eyeball-side surface 3 are combined by using the distance portion, the near portion and the intermediate portion, namely FIG. 1B is neither a figure showing the refractive power distribution of the object-side surface 2 nor a figure showing the refractive power distribution of the eyeball-side surface 3.

Next, the object-side surface 2 and the eyeball-side surface 3 provided as lens surfaces forming the progressive addition lens according to the present embodiment are described.

1-1 Object-Side Surface

Figure 2:
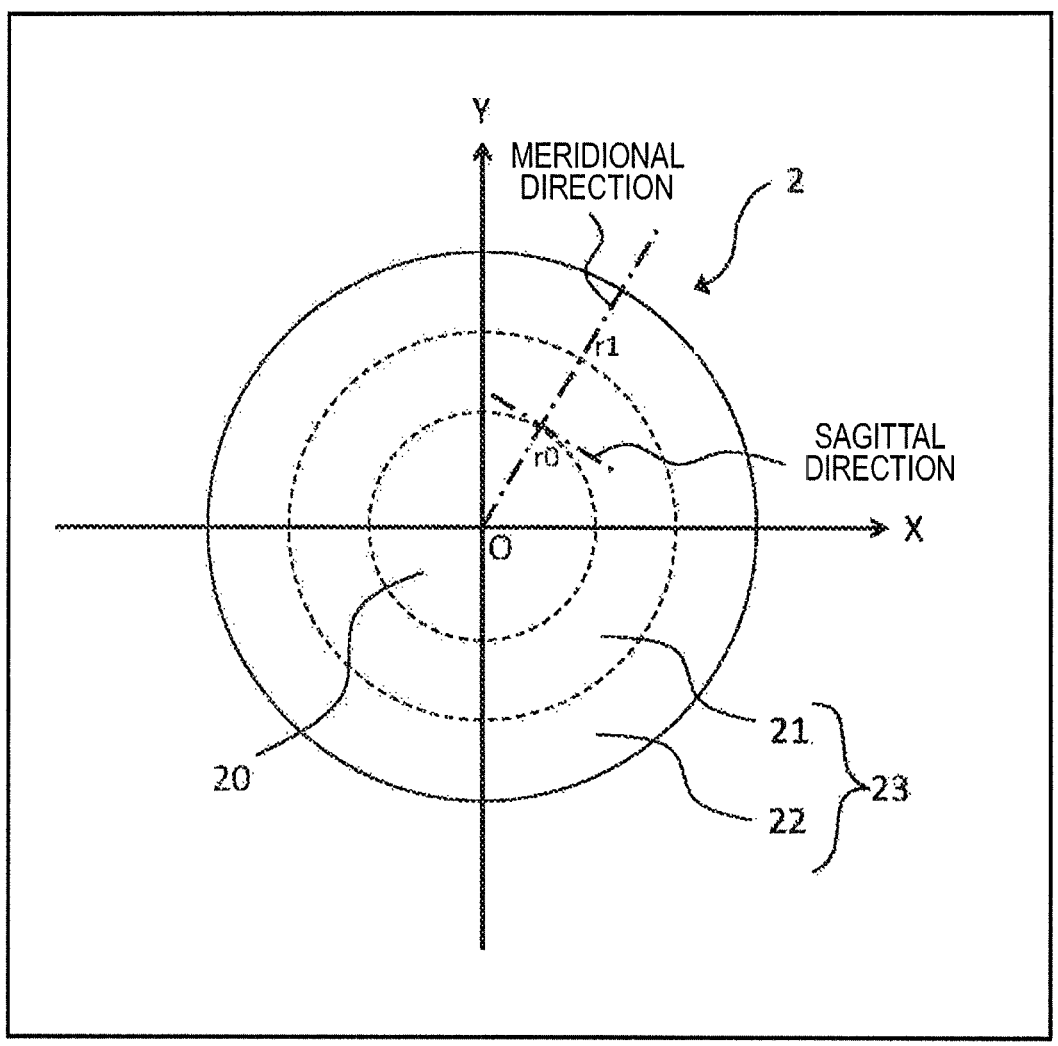
FIG. 2 is a plane view of an object-side surface of the progressive addition lens according to the present embodiment.

FIG. 2 is a plane view of the object-side surface 2, and in a case in which the progressive addition lens is used as a glasses lens, Y axis denotes a direction corresponding to a vertical direction of the lens and X axis denotes a direction corresponding to a horizontal direction of the lens. Further, as shown in FIG. 1A, Z axis denotes a thickness direction of the lens 1. The Z axis is perpendicular to both of the X and Y axes and perpendicular to a plane of FIG. 2. In other words, FIG. 2 is a projection in which the object-side surface 2 is projected on XY plane in Z axis direction. Accordingly, the object-side surface 2 is represented by using coordinates (x, y, z), and the coordinate in the Z axis direction is set in accordance with the refractive power distribution of the object-side surface.

Further, a center of design is defined on the object-side surface 2, and in the present embodiment, an apex (extreme value) of the object-side surface 2 provided by an intersection point between the Z axis and the object-side surface 2 is defined as the center of design in FIG. 1. In FIG. 2, when the center of design is projected on the XY plane, the projected center of design is matched with an intersection point of the X axis and the Y axis. In the present embodiment, the object-side surface 2 is formed in rotational symmetry with respect to a rotational center O defined by the center of design (intersection point of the X axis and the Y axis). Further, in the present embodiment, the center of design or the rotational center O is matched with a geometrical center of object-side surface 2, however the center of design may not be matched with the geometrical center. Specifically, the center of design (rotational center O) is preferably located within a circle having a radius of 5.0 mm with respect to the geometrical center.

As shown in FIG. 2, in the present embodiment, the object-side surface 2 has concentrically arranged three regions (the first stable region 20, the curvature changing region 21, and the second stable region 22). In other words, rotation symmetrical three regions with respect to the rotational center O are formed. Respective regions are smoothly connected with each other, and therefore a continuous single surface is formed.

Further, the object-side surface 2 may also be deemed to have two regions of the first stable region 20 and a concentric region including the curvature changing region 21 and the second stable region 22. Further, the region including the curvature changing region 21 and the second stable region 22 may also be deemed to be formed by a rotation symmetrical aspherical region 23.

1-1-1 First Stable Region

The first stable region 20 is formed by a surface including the rotational center O as the center of design. In the present embodiment, a PV value of mean surface refractive power of the first stable region is set to 0.12 D (diopter) or less. Here, the PV value denotes a surface accuracy and is defined by difference between a maximum value and a minimum value of the mean surface refractive power in an effective range. As to the surface accuracy of a spherical lens, mean surface refractive power in a range of 40Φ is defined within a range of ±0.06 D according to the ISO standard, and therefore the range described above is sufficiently small as a change amount of the mean surface refractive power and the range may denote a manufacturing error when the object-side surface is formed in lens manufacturing process. In other words, the first stable region 20 is formed by a spherical surface having the manufacturing error described above.

Figure 3:
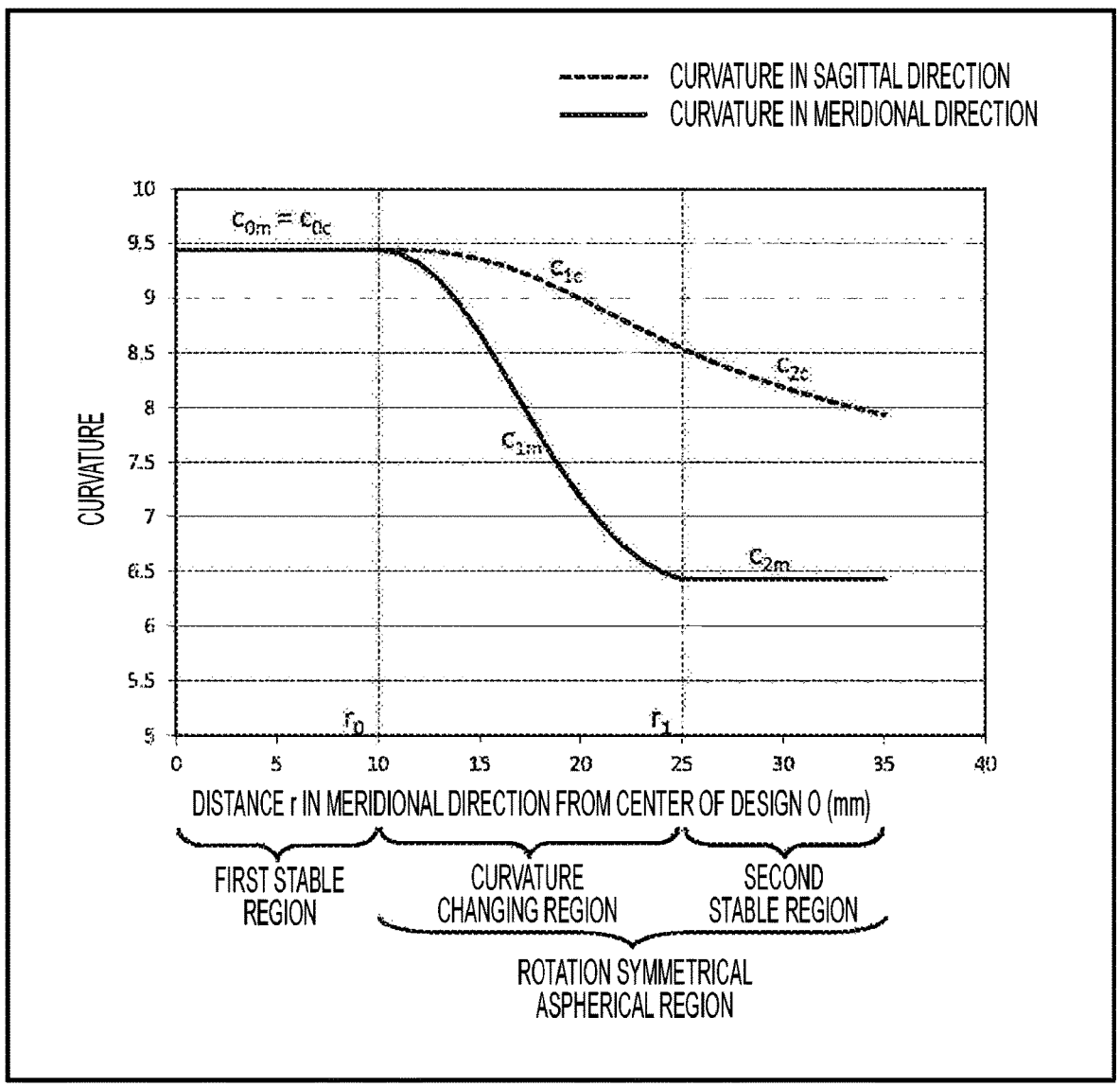
FIG. 3 shows a curvature in a meridional direction and a curvature in a sagittal direction in the object-side surface of the progressive addition lens according to the present embodiment.

Accordingly, in the present embodiment, the first stable region is defined as a region having a constant curvature $c_0$ in an arbitrary direction or a spherical surface for convenience of description, and "the curvature $c_0$ is constant" has the same meaning of that the change amount of the mean surface refractive power is set within the range described above. Thus, the first stable region according to the present embodiment is formed in a spherical surface not in a literal meaning but in a substantial meaning. In the object-side surface, a change of the curvature in a meridional direction and in a sagittal direction shown in FIG. 2 is shown in FIG. 3. It is obvious from FIG. 3 that the curvature in the meridional direction and the curvature in the sagittal direction are the same and constant in the first stable region, namely the change of the curvature $c_0$ is sufficiently small.

Here, a value of the curvature $c_0$ of the first stable region may be determined in accordance with a prescription of a user.

Further, as the rotational center O is defined by the origin of the XY plane, the first stable region 20 is defined by a range of a spherical surface within a radius $r_0$ from the rotational center O. Further, the coordinate in the Z axis direction is represented by a Formula 4 as below by using the curvature $c_0$ of the first stable region.

[Mathematical Formula 3]

$$z = \frac{c_0 \cdot r^2}{1 + \sqrt{1 - c_0^2 \cdot r^2}} \ldots (0 \le r \le r_0) \quad \text{Formula 4}$$

Here, r is represented by a Formula 5 as below by using the coordinates (x, y) on the XY plane.

[Mathematical Formula 4]

$$r = \sqrt{x^2 + y^2} \quad \text{Formula 5}$$

The radius $r_0$ of the first stable region may also be determined in accordance with a prescription of a user, and for example, $r_0$ is set to around 10 mm in the present embodiment.

1-1-2 Curvature Changing Region

As shown in FIG. 2, the curvature changing region 21 is arranged outside of the first stable region 20 so as to surround the first stable region 20. The curvature changing region 21 is defined by a ring shape region between radius $r_0$ and radius $r_1$. Further, the coordinate in the Z axis direction is represented by a Formula 6 as below.

[Mathematical Formula 5]

$$z = \frac{c_0 \cdot r^2}{1 + \sqrt{1 - c_0^2 \cdot r^2}} + \sum_{i=3}^{10} a_i \cdot (r - r_0)^i \ldots (r_0 \le r \le r_1) \quad \text{Formula 6}$$

Here, $a_i$ denotes an aspherical coefficient.

In the present embodiment, as shown in FIG. 3, a curvature $c_{1m}$ in the meridional direction is asymptotically reduced from the curvature $c_0$ toward an outer side of the object-side surface 2 from the rotational center O in the curvature changing region 21. Here, a curvature in the sagittal direction $c_{1c}$ is also preferably reduced asymptotically from the curvature $c_0$. In other words, the curvature changing region 21 is formed such that the refractive power in both directions of the meridional direction and the sagittal direction of the object-side surface 2 is reduced asymptotically. The curvature changing region 21 is formed by a smooth curve surface, and therefore when the curvature in the meridional direction is changed as an example, the curvature in the sagittal direction is also changed in order to keep the curve surface. Although it is described in detail as below, since the curvature $c_{1m}$ in the meridional direction and the curvature $c_{1c}$ in the sagittal direction are reduced from the curvature $c_0$, a jumping or warping of images can be reduced.

As a result of the setting described above, the curvature changing region 21 according to the present embodiment satisfies the following conditions as one example.

Condition 1

The curvature in the meridional direction from the center of design toward an outer peripheral of the object-side surface is smaller than the curvature in the meridional direction in the first stable region.

Condition 2

The curvature in the sagittal direction perpendicular to the meridional direction is smaller than the curvature in the sagittal direction in the first stable region.

Here, if the Condition 1 is satisfied, the Condition 2 is automatically satisfied. Thus, it is preferable to satisfy at least the Condition 1.

Further, at least one of the curvature $c_{1m}$ in the meridional direction and the curvature $c_{1c}$ in the sagittal direction may be asymptotically reduced from the rotational center O toward the outer side of the object-side surface 2.

In addition, in the present embodiment, as shown in FIG. 3, the curvature $c_{1m}$ in the meridional direction is smaller than the curvature $c_{1c}$ in the sagittal direction in the curvature changing region 21. Although it is described in detail as below, with such a configuration, an aspect ratio of images can be improved.

Further, the refractive power is asymptotically reduced in the curvature changing region 21, namely a progressive element having a progressive refractive effect caused by the progressive addition lens according to the present embodiment is arranged in the curvature changing region 21.

As described above, the first stable region 20 in which the curvature $c_0$ is constant is arranged in the center of design of the object-side surface 2, and the curvature changing region in which the curvature $c_{1m}$ in the meridional direction and the curvature $c_{1c}$ in the sagittal direction are reduced toward the outer side of the object-side surface is arranged outside of the first stable region 20. As a result, although it is described in detail as below, a holding property when the lens is fixed to a lens holder by using a block ring can be improved, and stable power can be obtained by the first stable region, and the jumping and the warping of images can be reduced, and the aspect ratio of images can be improved.

1-1-3 Second Stable Region

The object-side surface 2 may be formed by the first stable region 20 and the curvature changing region 21, however in the present embodiment, the object-side surface 2 further includes the second stable region 22 arranged outside of the curvature changing region 21 so as to surround the curvature changing region 21. As shown in FIG. 2, the second stable region is formed as a ring shape region having a radius r which is larger than the radius $r_1$. Further, the coordinate in the Z axis direction is represented by a Formula 7 as below.

[Mathematical Formula 6]

$$z = \frac{c_1 \cdot (r - r_2)^2}{1 + \sqrt{1 - c_1^2 \cdot (r - r_2)^2}} + z_1 \ldots (r_1 < r) \quad \text{Formula 7}$$

Here, $c_1$, $r_2$, and $z_1$ are represented by Formulas 8 to 13.

[Mathematical Formula 7]

$$c_1 = \frac{\frac{d^2y}{dx^2}(r_1)}{\left(1 + \left(\frac{dy}{dx}(r_1)\right)^2\right)^{3/2}} \quad \text{Formula 8}$$

[Mathematical Formula 8]

$$r_2 = r_1 - \frac{\frac{dy}{dx}(r_1)}{c_1 \cdot \sqrt{1 + \left(\frac{dy}{dx}(r_1)\right)^2}} \quad \text{Formula 9}$$

[Mathematical Formula 9]

$$z_1 = z(r_1) - \frac{c_1 \cdot (r_1 - r_2)^2}{1 + \sqrt{1 - c_1^2 \cdot (r_1 - r_2)^2}} \quad \text{Formula 10}$$

[Mathematical Formula 10]

$$z(r_1) = \frac{c_0 \cdot r_1^2}{1 + \sqrt{1 - c_0^2 \cdot r_1^2}} + \sum_{i=3}^{10} a_i \cdot (r_1 - r_0)^i \quad \text{Formula 11}$$

[Mathematical Formula 11]

$$\frac{dz}{dr}(r_1) = \frac{c_0 \cdot r_1^2}{\sqrt{1 - c_0^2 \cdot r_1^2}} + \sum_{i=3}^{10} i \cdot a_i \cdot (r_1 - r_0)^{i-1} \quad \text{Formula 12}$$

[Mathematical Formula 12]

$$\frac{d^2z}{dr^2}(r_1) = \frac{c_0}{(1 - c_0^2 \cdot r_1^2)^{3/2}} + \sum_{i=3}^{10} i \cdot (i-1) \cdot a_i \cdot (r_1 - r_0)^{i-2} \quad \text{Formula 13}$$

In the second stable region, the PV value of the mean surface refractive power in the meridional direction is within a range of 0.25 D or less. This range is larger than the range of the change amount of the mean surface refractive power in the first stable region 20. Namely, manufacturing error of the mean surface refractive power in the meridional direction in the second stable region is estimated larger than that of the mean surface refractive power in the first stable region 20. Accordingly, the change amount of the mean surface refractive power in the meridional direction may be similar to the change amount of the mean surface refractive power in the first stable region, and the change amount of the mean surface refractive power may be intentionally controlled within the range described above in view of manufacturing.

The range of the change amount of the mean surface refractive power in the meridional direction is larger than the range of the change amount of the mean surface refractive power in the first stable region, however the range of the change amount of the mean surface refractive power in the meridional direction is also within a range of manufacturing error. In view of this, in the present embodiment, when the PV value of the mean surface refractive power in the second stable region is within the range described above, it is defined that the mean surface refractive power is substantially constant. Accordingly, similarly to the first stable region, "the curvature $c_{2m}$ in the meridional direction is substantially constant" has the same meaning of that the change in the mean surface refractive power is set within the range described above. Here, the mean surface refractive power in the sagittal direction in the second stable region is changed beyond the aforementioned range of the PV value of the mean surface refractive power in the meridional direction, and therefore the mean surface refractive power in the sagittal direction is not substantially constant. Accordingly, the second stable region 22 is not formed in a spherical surface.

Since the mean surface refractive power in the meridional direction is substantially constant, it is suppressed that a peripheral portion of the lens is thinned and both surfaces of the object-side surface and the eyeball-side surface are formed in a convex shape. As a result, manufacturing of the lens can be facilitated. Especially, in the present embodiment, since the object-side surface including the second stable region is formed in rotational symmetry with respect to the center of design, when the lens is processed while being rotated, the processing can be facilitated.

Further, since the curvature changing region and the second stable region are smoothly (continuously) connected, a magnitude correlation of the curvature $c_{1m}$ in the meridional direction and the curvature $c_{1c}$ in the sagittal direction in the curvature changing region is reflected in the second stable region. Accordingly, as shown in FIG. 3, a curvature $c_{2m}$ in the meridional direction is smaller than a curvature $c_{2c}$ in the sagittal direction at the same position. Thus, also in the second stable region, the curvature $c_{2m}$ in the meridional direction is smaller than the curvature $c_{2c}$ in the sagittal direction. As a result, similarly to the curvature changing region, the aspect ratio of images can be improved.

1-2 Eyeball-Side Surface

The eyeball-side surface is not limited to a specific configuration as long as a predetermined progressive refractive effect on a transmission image transmitted through the lens can be obtained by the eyeball-side surface in conjunction with the object-side surface. In the present embodiment, the eyeball-side surface has a surface refractive power change which cancels a change of the surface refractive power of the curvature changing region in the object-side surface, and a progressive element having the progressive refractive effect is arranged on the eyeball-side surface.

1-3 Combination of the Object-Side Surface and the Eyeball-Side Surface

Each of the object-side surface and the eyeball-side surface is merely a lens surface and the progressive refractive effect having the function of the distance portion, the near portion and the intermediate portion cannot be obtained by either one lens surface. By combining the object-side surface and the eyeball-side surface and forming the lens, the progressive refractive effect on the transmission image transmitted through the lens can be obtained, and images to which the progressive refractive effect is applied are formed on a retina of a user of the lens.

In the present embodiment, by combining the object-side surface and the eyeball-side surface having the configurations described above, in the images to which the progressive refractive effect is applied, the jumping and the warping of the images caused by magnification difference between the distance portion and the near portion can be reduced. Such an effect can be obtained by a mechanism described below.

Figure 4:
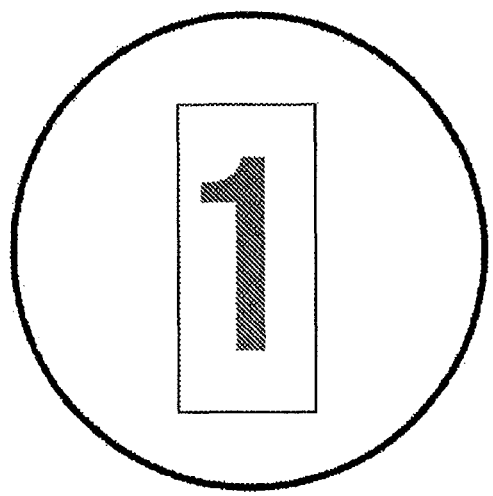
FIGS. 4A and 4B show magnification difference between the distance portion and the near portion.
Figure 4:
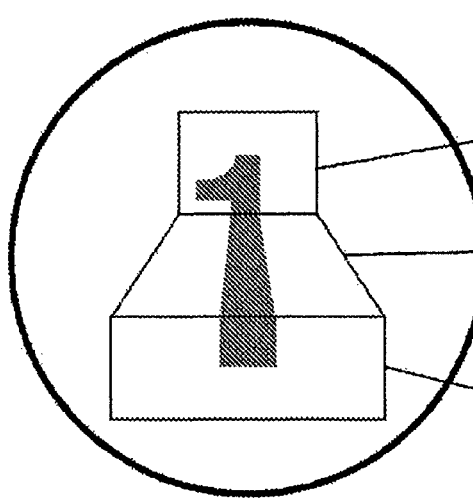

As shown in FIG. 4A, when seen through the lens having a constant power, the image of the object is enlarged similarly at any portion on the lens, and therefore the jumping and the warping of the image is not generated. On the other hand, in the progressive addition lens, the power of the near portion is set by adding a predetermined power into the power of the distance portion. Accordingly, as shown in FIG. 4B, since the image seen through the intermediate portion and the near portion is larger than the image seen through the distance portion, the jumping and the warping of the image is generated when the progressive addition lens is used as the glasses lens.

Accordingly, in the present embodiment, a portion adjacent to the region corresponding to the distance portion of the progressive addition lens obtained by combining the object-side surface and the eyeball-side surface is arranged to face the first stable region, and a portion adjacent to the region corresponding to the intermediate portion and the near portion of the lens is arranged to face the curvature changing region (and the second stable region as needed).

As described above, the curvatures ($c_{1m}$, $c_{1c}$, $c_{2m}$, $c_{2c}$) in the curvature changing region and the second stable region are smaller than the curvature $c_0$ in the first stable region. Thus, difference between the power of the first stable region and the power of the curvature changing region and the second stable region can cancel an increased amount of the power of the intermediate portion and the near portion with respect to the power of the distance portion. As a result, the magnification difference between the distance portion and the near portion is reduced, and therefore the jumping and the warping of images can be reduced.

Namely, it is preferable that the region corresponding to the distance portion of the progressive addition lens mainly corresponds to the first stable region of the object-side surface. Normally, since the change of power (change of curvature) is less in the distance portion, it is preferable that the first stable region in which the change of power is not generated on the object-side surface corresponds to the distance portion. Especially, it is preferable that a distance power measuring point which is a reference point for measuring distance power is located in (corresponds to) the first stable region of the object-side surface. In a case in which the distance power measuring point corresponds to the first stable region, since the distance power can be measured in a region in which the change of power is less, a measuring with high accuracy can be performed.

Further, it is preferable that the region corresponding to the intermediate portion and the region corresponding to the near portion mainly correspond to the curvature changing region and the second stable region of the object-side surface. Since the refractive power is continuously changed in the intermediate portion, and the change of the refractive power in the near portion is larger than the change of the refractive power in the distance portion, it is preferable that the curvature changing region and the second stable region in which at least one of the curvature in the meridional direction and the curvature in the sagittal direction is changed correspond to these region. Especially, it is preferable that a near power measuring point which is a reference point for measuring near power is located in (corresponds to) the curvature changing region or the second stable region of the object-side surface. In a case in which the near power measuring point corresponds to the curvature changing region or the second stable region, the effect of the change of curvature can be obtained in the intermediate portion and the near portion.

Figure 5:
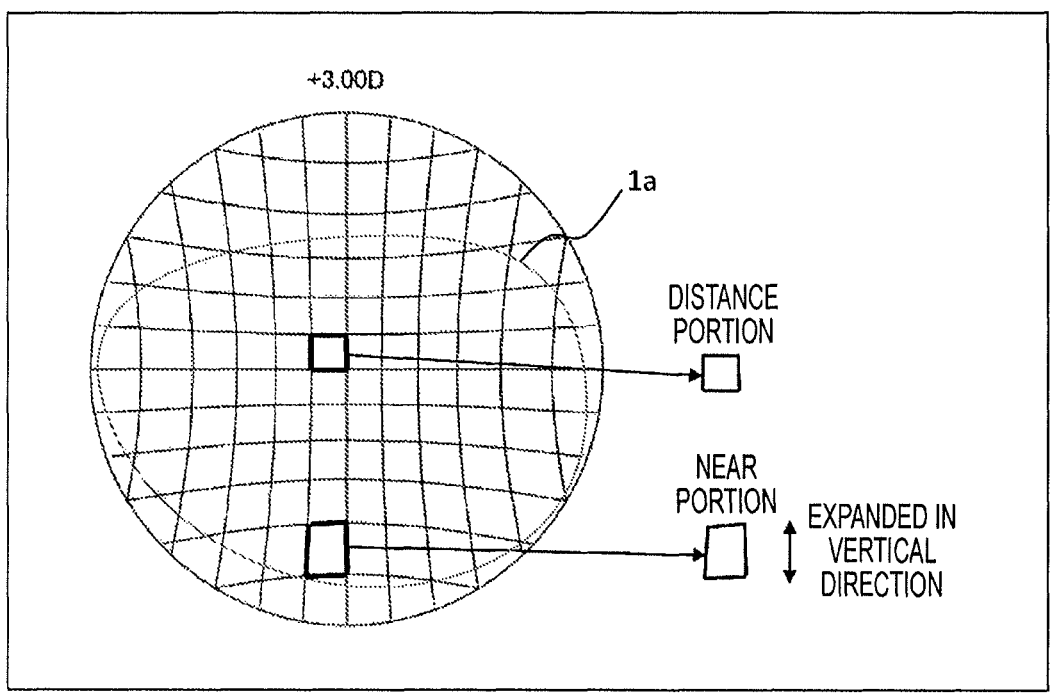
FIG. 5 shows difference of aspect ratio of an image between in the distance portion and in the near portion.

Further, in the progressive addition lens according to the present embodiment, by combining the object-side surface and the eyeball-side surface having the configurations described above, the aspect ratio of images can be improved. The progressive addition lens according to the present embodiment is formed for presbyopia, and the distance power is set to a plus value. Thus, when the lens is used for a glasses lens, since the near portion is arranged at a lower side of the lens compared to the distance portion arranged adjacent to the center of the lens, the object is seen to be expanded in a vertical direction in the near portion compared to in the distance portion. In a case in which the object-side surface is formed in a spherical surface of +3.00 D (diopter), as shown in FIG. 5, the aspect ratio in the near portion of a glasses lens 1$a$ is largely different from 1, and therefore the aspect ratios of images are different in the near portion and in the distance portion.

Accordingly, in the present embodiment, as shown in FIG. 3, the curvature $c_{1m}$ in the meridional direction is set to be smaller than the curvature $c_{1c}$ in the sagittal direction in the curvature changing region. Since the curvature changing region is formed in a smooth curve surface, as the curvature in the meridional direction becomes smaller, the curvature in the sagittal direction also becomes smaller to keep the curve surface. Here, the curvature $c_{1c}$ in the sagittal direction is not small compared to the curvature $c_{1m}$ in the meridional direction, and difference between the curvature $c_{1m}$ in the meridional direction and the curvature $c_{1c}$ in the sagittal direction is generated in the curvature changing region.

In a state in which such a difference of the curvatures is generated, when seen through the region corresponding to the curvature changing region, the object is seen to be expanded in the sagittal direction. On the other hand, the curvature in the meridional direction in the curvature changing region corresponds to the curvature in the vertical direction of the near portion, and the curvature in the sagittal direction in the curvature changing region corresponds to the curvature in the horizontal direction of the near portion. As a result, an expanding effect in the horizontal direction caused by the curvature changing region cancels an expanding effect in the vertical direction shown in FIG. 5, and therefore the aspect ratio of images in the near portion can be close to 1 compared to a configuration without the curvature changing region.

Further, since each of the curvature changing region and the second stable region in the present embodiment is formed in a rotation symmetric ring shape with respect to the rotational center O, the curvature changing region and the second stable region may be possible to correspond to a region above the distance portion. In this case, a curvature distribution may be set to the eyeball-side surface to cancel the change of curvature of the curvature changing region and the second stable region correspond to the region above the distance portion.

2. Method of Manufacturing the Progressive Addition Lens

Figure 6:
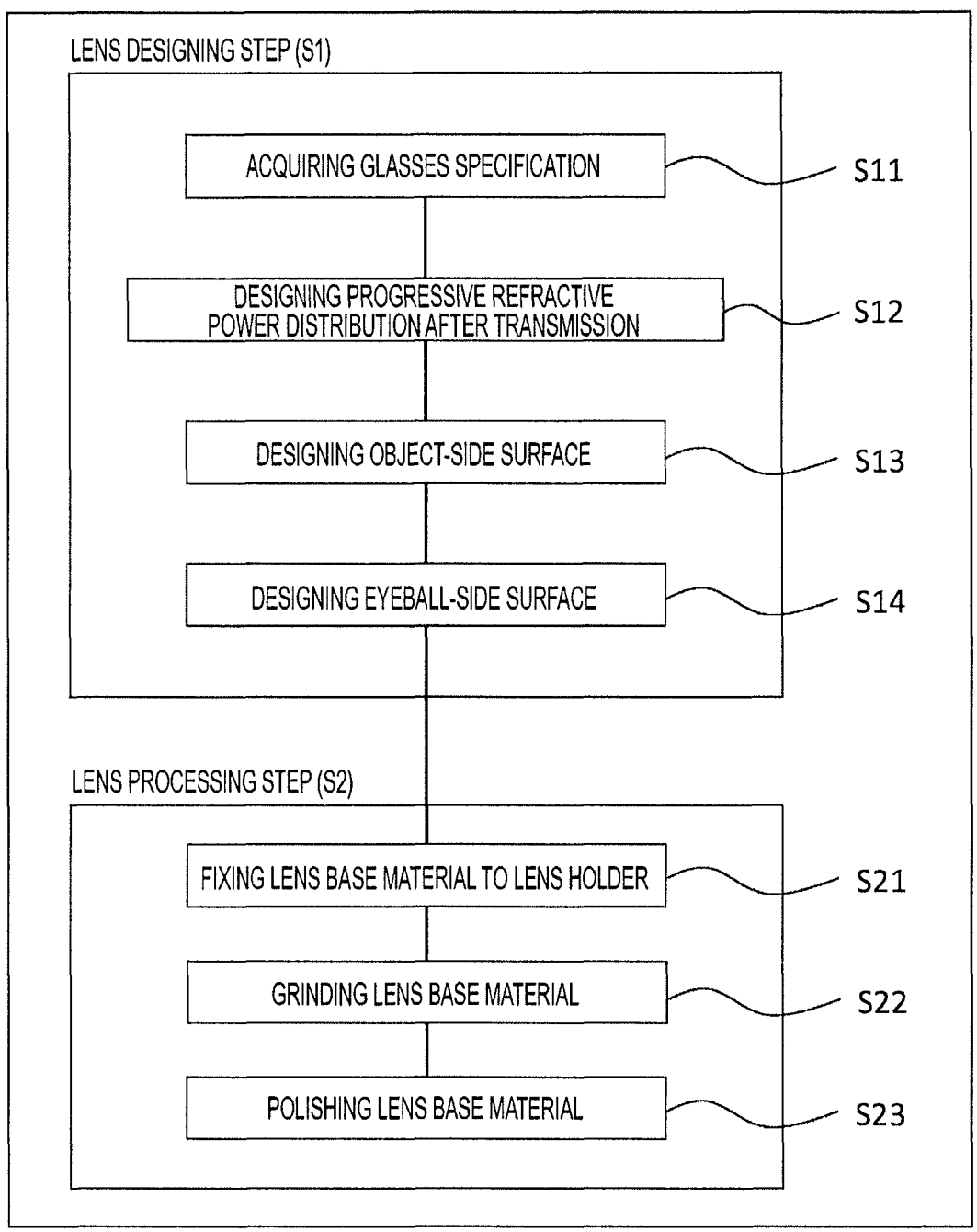
FIG. 6 is a flow chart showing each step of a method of manufacturing the progressive addition lens according to the present embodiment.

Next, a method of manufacturing the progressive addition lens according to the present embodiment is described with reference to a flow chart shown in FIG. 6. The method of manufacturing the progressive addition lens according to the present embodiment mainly includes a lens designing step S1 and a lens processing step S2.

Lens Designing Step S1

In the lens designing step S1, after acquiring a glasses specification such as lens information, prescription information and the like (glasses specification acquiring step S11), the progressive addition lens according to the present embodiment is designed based on necessary information (distance power, near power, addition power and the like) for designing the progressive addition lens among the information of the glasses specification. A progressive power distribution designing step S12, an object-side surface designing step S13, and an eyeball-side surface designing step S14 included in the lens designing step S1 are described in detail as below.

Progressive Power Distribution Designing Step S12

In this step, a refractive power distribution, which is the same as that of the progressive addition lens to be designed, is set to only an inner surface (surface to be located at an eyeball-side) prior to designing the progressive addition lens according to the present embodiment. Namely, it is designed such that the inner surface is formed as a progressive refractive surface having the same progressive refractive effect as that of the progressive addition lens to be designed, and an outer surface (surface to be located at an object-side) is formed in a spherical surface. Namely, a progressive element having the progressive refractive effect is set to only the inner surface.

As a method of designing such a progressive power distribution, a well-known method may be used. For example, in designing the inner surface, astigmatism is set to be a minimum on a main line of sight, and then a refractive power at each position on the surface is set based on a required progressive refractive surface, and the progressive refractive surface is formed by smoothly connecting those. Further, the progressive refractive surface may be corrected by using a light tracing method and the like.

Object-side Surface Designing Step S13

In this step, the object-side surface set as a spherical surface in advance is corrected by using the refractive power distribution of the inner surface and a spherical power of the outer surface acquired from the necessary information for designing the progressive addition lens, and then the rotational center, the curvature and the radius of the first stable region, the curvature and the radius of the curvature changing region, and the curvature and the radius of the second stable region is set on the object-side surface. For example, the curvature of the first stable region may be the same as the curvature of the outer surface.

With such a configuration, the first stable region, the curvature changing region, and the second stable region, which are rotationally symmetrical with respect to the rotational center, are set on the object-side surface.

Eyeball-side Surface Designing Step S14

In this step, the surface refractive power change of the eyeball-side surface may be calculated from the designed object-side surface and a transmission refractive power distribution of the progressive addition lens to be designed such that the surface refractive power change due to the curvature changing region of the object-side surface is canceled. In order to calculate the eyeball-side surface, a well-known method such as a vector operation and the like may be used.

By performing the steps described above, the progressive addition lens according to the present embodiment is designed. And then, the progressive addition lens is manufactured based on the obtained design data of the object-side surface and the eyeball-side surface.

Lens Processing Step S2

The lens processing step S2 includes at least a block step S21, a grinding step S22, and a polishing step S23. In the lens processing step S2, at first, a base material (semi-finish lens) having an appropriate base curve is prepared based on the design data of the object-side surface and the eyeball-side surface. For example, the base material having the same base curve as the curvature of the first stable region of the object-side surface may be prepared. The base material is arranged on a processing device such as a grinding device, and by inputting the design data into the processing device, processing of the base material is performed to form the base material having the refractive power distribution defined in the design data. The processing of the base material may be performed by a well-known method, for example, after a surface of the base material is grinded by using the grinding device and an optical surface is formed, the base material is polished by using a polishing device.

Block Step S21

In this step, the prepared base material is fixed on a lens holder. In the present embodiment, the lens holder is provided with a fixture as a base of the base material, and low melting point alloy for fixing the fixture and the base material. When the fixture and the base material are fixed, at first, the fixture is fixed on a mount base and a circular block ring is arranged around the fixture. And then, the base material is arranged on the block ring such that a convex surface of the base material is supported by the block ring. At this time, the fixture and the base material are not in contact with each other, and a space is formed between (i) the fixture and the mount base and (ii) the block ring and the base material. By filling the low melting point alloy into the space and solidifying the low melting point alloy, the fixture and the base material can be fixed, and by releasing the fixture and the base material from the mount base and the block ring, the base material held by the lens holder can be obtained.

A height of the block ring for fixing the fixture and the base material is normally constant, and a plurality of block rings having different radiuses and heights based on a size and a base curve of the base material to be processed are prepared.

Here, generally, a both-sided progressive addition lens has a rotationally asymmetrical surface on its both surfaces. For example, in the progressive addition lens disclosed in Patent Literature 1, a progressive surface formed in rotation asymmetry is arranged on an eyeball-side surface, and a rotationally asymmetrical surface having different curvatures in the vertical direction and the horizontal direction is arranged on an object-side surface. Thus, a lens position of the same radius has a different coordinate in Z axis, namely a different height. When the lens having such a surface is arranged on the block ring having a constant height, the lens is only supported by a part of the block ring. As a result, a backlash of the lens on the block ring is easily generated and a position of the lens is easily deviated. Thus, in order to support such a rotationally asymmetrical surface, a special block ring is needed and therefore a cost is increased.

However, in the progressive addition lens according to the present embodiment in which the object-side surface is formed in rotational symmetry, since the lens position of the same radius has the same coordinate in the Z axis, when the lens is arranged on the block ring having a constant height, the lens is supported by the whole of the block ring. Accordingly, in the progressive addition lens according to the present embodiment, since a normal block ring can be used, although the progressive addition lens is formed as a both-sided progressive addition lens, the progressive addition lens can be manufactured in a low cost.

Further, when the lens is fixed by using the block ring, since the inner surface is processed while fixing the processed outer surface, a processing position of the inner surface with respect to a fixing position of the outer surface may be deviated from a designed position. Since the block ring is formed in a circular shape, the positional deviation is mainly a rotational deviation generated in a clockwise direction or in a counterclockwise direction with respect to a center point adjacent to the center of design of the lens. When the lens is grinded or polished in a state in which such a deviation is generated, the refractive power distribution of the final lens manufactured by combining one surface and another surface is different from the designed refractive power distribution, and therefore the required refractive power distribution cannot be obtained. Especially, in the both-sided progressive addition lens such as the progressive addition lens disclosed in Patent Literature 1, since the rotationally symmetrical surface is not formed, if the rotational deviation is generated on one surface, the refractive power should be shown before the lens is deviated and the refractive power after the lens is deviated may be different from each other. As a result, the (designed) refractive power distribution should be obtained by the combination is not achieved, a power deviation on the final lens is generated, and a deviation of an astigmatism axis is largely generated, and therefore an optical property of the final lens to be manufactured is largely deteriorated.

On the other hand, in the progressive addition lens according to the present embodiment in which the object-side surface is formed in rotational symmetry, since the object-side surface is rotationally symmetrical, even if the rotational deviation is generated, the refractive power before the lens is deviated and the refractive power after the lens is deviated are the same, and therefore the power deviation on the final lens manufactured by the combination is not generated, and the deviation of the astigmatism axis can be also suppressed.

Grinding Step S22 and Polishing Step S23

Next, the lens holder holding the base material is mounted to a grinding processing device, and the optical surface is formed by performing grinding processing (grinding step S22). After the grinding processing, the lens holder holding the base material is released from the grinding processing device and mounted to a polishing processing device, and polishing processing is performed (polishing step S23). Such grinding device and polishing device perform the processing while rotating the base material, and therefore the processing of the surface formed by a rotationally symmetrical region is performed easily. Accordingly, although the progressive element is set to both surfaces of the lens in the progressive addition lens according to the present embodiment, the processing of the object-side surface can be performed easily compared to a normal both-sided progressive addition lens, and a product yield can be improved. After that, by performing surface treatment such as coating and the like and lens shape processing as needed, the glasses lens may be manufactured.

3. Effects of the Present Embodiment

The progressive addition lens according to the present embodiment is formed as a both-sided progressive addition lens in which the progressive element is set to both of the object-side surface and the eyeball-side surface, however by forming the object-side surface in a rotationally symmetrical surface, the progressive addition lens can maintain an optical property and facilitate its manufacturing.

Namely, by forming the object-side surface in rotational symmetry, a lens position of the same radius has the same lens height (coordinate in Z axis). Accordingly, when the object-side surface is supported by arranging the lens on a normal block lens having a constant height, since the object-side surface is supported by the whole of the block ring, a backlash is not generated and a positional deviation of the lens is not easily generated in fixing, and therefore positional accuracy of the combination of the object-side surface and the eyeball-side surface can be ensured.

Further, when the lens is processed while fixing the processed outer surface of the lens one by one by using the lens holder, even if the processing position of the inner surface with respect to the fixing position of the outer surface is deviated from the designed position, influence to the optical property caused by the deviation can be suppressed at a minimum.

Namely, the positional deviation generated in fixing the lens to the lens holder is a rotational deviation generated in a clockwise direction or in a counterclockwise direction with respect to the center point adjacent to the center of design of the lens. However, the object-side surface of the progressive addition lens according to the present embodiment is formed in a rotationally symmetrical surface with respect to the center point adjacent to the center of design. Accordingly, even if the rotational deviation is generated in fixing the lens, the power change is not generated, and even if the deviation of the astigmatism axis is generated, the deviation can be suppressed at a minimum.

Further, in an inner surface progressive lens in which the progressive surface having the progressive refractive effect is arranged on the eyeball-side surface (inner surface) located at a side of an eyeball and the object-side surface (outer surface) located at a side of an object is formed in a spherical surface, the jumping and the warping of images are reduced by canceling the fluctuation of the shape factor by setting the shape factor among two factors determining the glasses lens magnification to be constant. However, even if the object-side surface is formed in the spherical surface, in a case, for example, in which power difference between the distance portion and the near portion is large, the jumping and the warping of images is not reduced sufficiently.

Accordingly, in the present embodiment, the object-side surface is not formed by only the spherical surface but formed by a complex surface in which the first stable region (substantially spherical surface), which is deemed that the curvature in an arbitrary direction is constant, is arranged at the center of the object-side surface, and an aspherical surface region in which a curvature in the meridional direction is reduced from the curvature in the first stable region is arranged outside of the first stable region. With such a configuration, in addition to the advantageous effect in manufacturing described above, a stable power in a lens region (mainly distance portion) corresponding to the first stable region can be obtained, and a part of power difference between the distance portion and the near portion is canceled by the power difference generated in the object-side surface, and magnification difference between the distance portion and the near portion caused by the power difference between the distance portion and the near portion can be reduced.

Specifically, in the present embodiment, the stable power in the distance portion is ensured by arranging the first stable region of the object-side surface so as to correspond to a region having a function of the distance portion in the progressive addition lens. Further, the curvature changing region and the second stable region in the object-side surface are arranged so as to correspond to a region having a function of the intermediate portion and the near portion in the progressive addition lens. The curvature changing region is arranged outside of the first stable region, and the curvature in the meridional direction and the curvature in the sagittal direction are reduced from the curvature of the first stable region toward the outer side of the lens. Thus, the image is shrunk in the curvature changing region compared to in the first stable region. In other words, the power is increased from the near portion toward the distance portion. Accordingly, a part of the power difference between the distance portion and the near portion is canceled, and the magnification difference between the distance portion and the near portion can be reduced.

Further, the progressive addition lens according to the present embodiment can improve the aspect ratio of images. Namely, in a plus lens for presbyopia, the image is expanded in the vertical direction in the near portion located at the lower side of the lens compared to in the distance portion located adjacent to the center of the lens. As a result, the aspect ratio of images in the near portion is largely different from 1.

Accordingly, in the progressive addition lens according to the present embodiment, the curvature in the meridional direction is set to be smaller than the curvature in the sagittal direction in the curvature changing region. Further, the region corresponding to the near portion is the curvature changing region mainly arranged outside of the first stable region. The meridional direction in the curvature changing region corresponds to the vertical direction in the near portion, and the sagittal direction in the curvature changing region corresponds to the horizontal direction in the near portion. As a result, in the near portion, since the curvature in the vertical direction is smaller than the curvature in the horizontal direction due to the curvature changing region, the image is expanded in the horizontal direction. Thus, this effect can cancel the effect of expanding the image in the vertical direction, and therefore the aspect ratio of images is to be close to 1 and a less incongruous and comfortable field of vision can be obtained.

Even if the second stable region is arranged on the object-side surface, since at least the curvature in the meridional direction is smaller than the curvature in the first stable region, similarly to the curvature changing region, the magnification difference between the distance portion and the near portion can be reduced.

Further, the curvature in the meridional direction in the second stable region corresponds to the curvature in an outer peripheral part of the curvature changing region, and its change amount is limited within a specific region. As a result, since the object-side surface and the eyeball-side surface are not formed in a convex shape, the manufacturing is easily performed. Further, since the curvature in the meridional direction is smaller than the curvature in the sagittal direction, also in the second stable region, the aspect ratio of images can be improved similarly to the curvature changing region.

Further, by defining the center of design adjacent to a geometrical center of the object-side surface and forming the object-side surface in the rotationally symmetrical surface with respect to the center of design, although it is the both-sided progressive addition lens, the processing of the object-side surface can be easily performed.

4. Modified Example

In the embodiment described above, the refractive power having the progressive refractive effect is set to the eyeball-side surface, however the eyeball-side surface may have a refractive power distribution in which a refractive power for correction for astigmatism is added to the refractive power having the progressive refractive effect.

In the embodiment described above, the first stable region is formed in a circular shape on the projection on the XY plane, however the first stable region may be formed in other shape as long as it is rotationally symmetrical on the projection. For example, the first stable region may be formed in an oval shape.

In the embodiment described above, the curvature changing region and the second stable region is arranged as a single region respectively in the object-side surface, however each of the curvature changing region and the second stable region may be formed by a plurality of regions arranged in a rotationally symmetrical manner.

In the embodiment described above, the distance power measuring point is arranged within the first stable region, and the near power measuring point is arranged within the curvature changing region or the second stable region, however the distance power measuring point may be arranged within the curvature changing region or the second stable region, and the near power measuring point may be arrange within the first stable region. With such an arrangement, the aspect ratio of the change of curvature in the intermediate portion and the distance portion can be improved.

The embodiment of the present invention is described above, however the present invention is not limited to the embodiment described above, and various modifications may be adopted within a scope of the present invention.

EXAMPLE

Hereinafter, the present invention is described based on a further detailed example, however the present invention is not limited to the example.

Example 1

In Example 1, a progressive addition lens having a progressive refractive effect in which the distance power is +4.00 D (diopter) and the addition power is 2.00 D (diopter) is designed. The object-side surface is set as below. The first stable region has the curvature $c_0$ of 9.441 and is formed in a circle having the radius of 10 mm on the projection on the XY plane. The curvature changing region has the curvature $c_{1m}$ in the meridional direction of 9.441 to 6.425 reduced asymptotically and is formed in a ring shape having the radius of 10 to 25 mm on the projection on the XY plane. The second stable region has the curvature $c_{2m}$ in the meridional direction of 6.425 and is formed in a ring shape having the radius of 25 to 35 mm on the projection on the XY plane.

The eyeball-side surface is obtained from the progressive power distribution having the progressive refractive effect described above and the refractive power distribution of the object-side surface after the progressive power distribution is designed to the inner surface.

Figure 7:
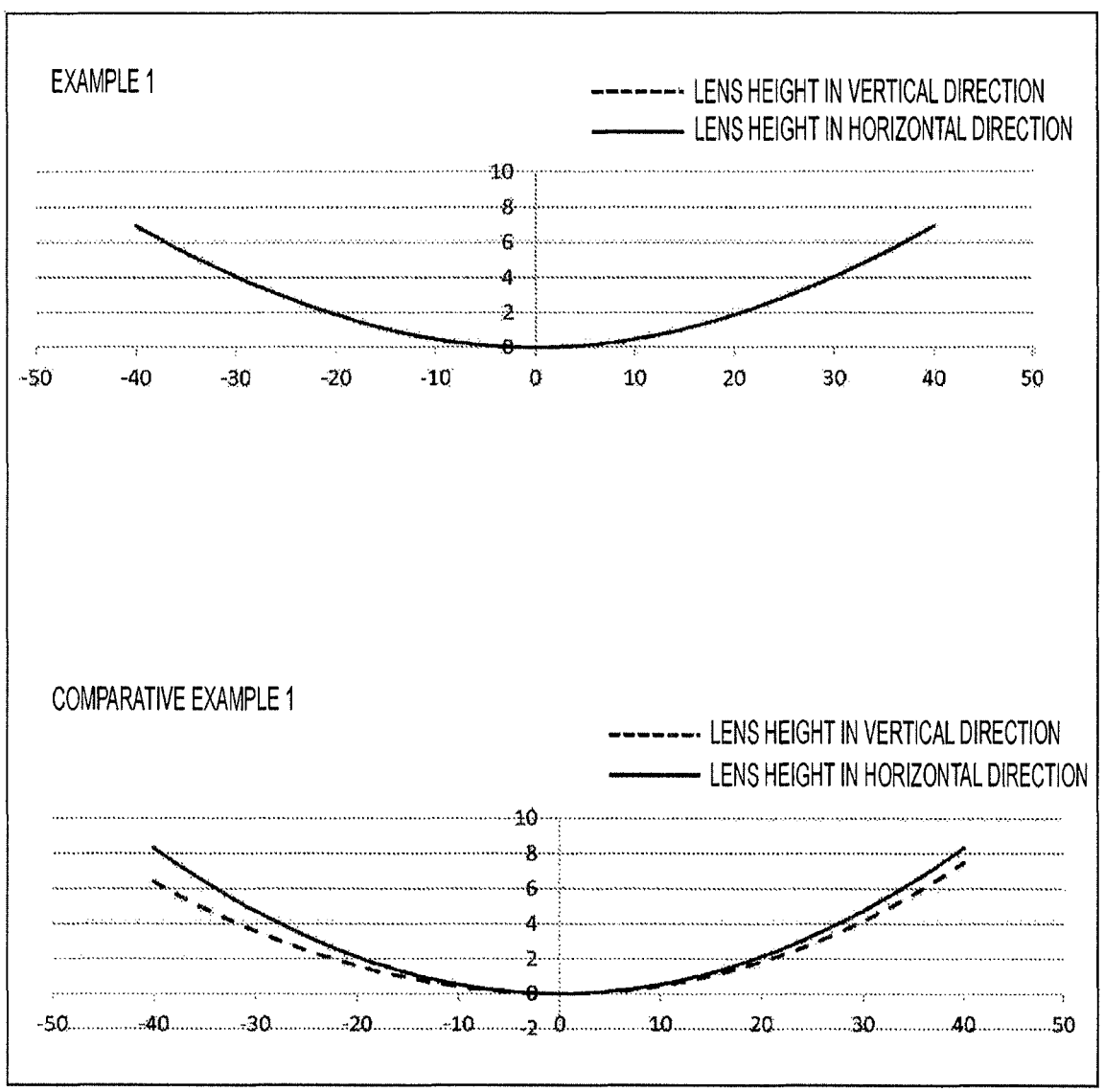
FIG. 7 is a graph showing respective lens heights of Example 1 and Comparative Example 1.
Figure 8:
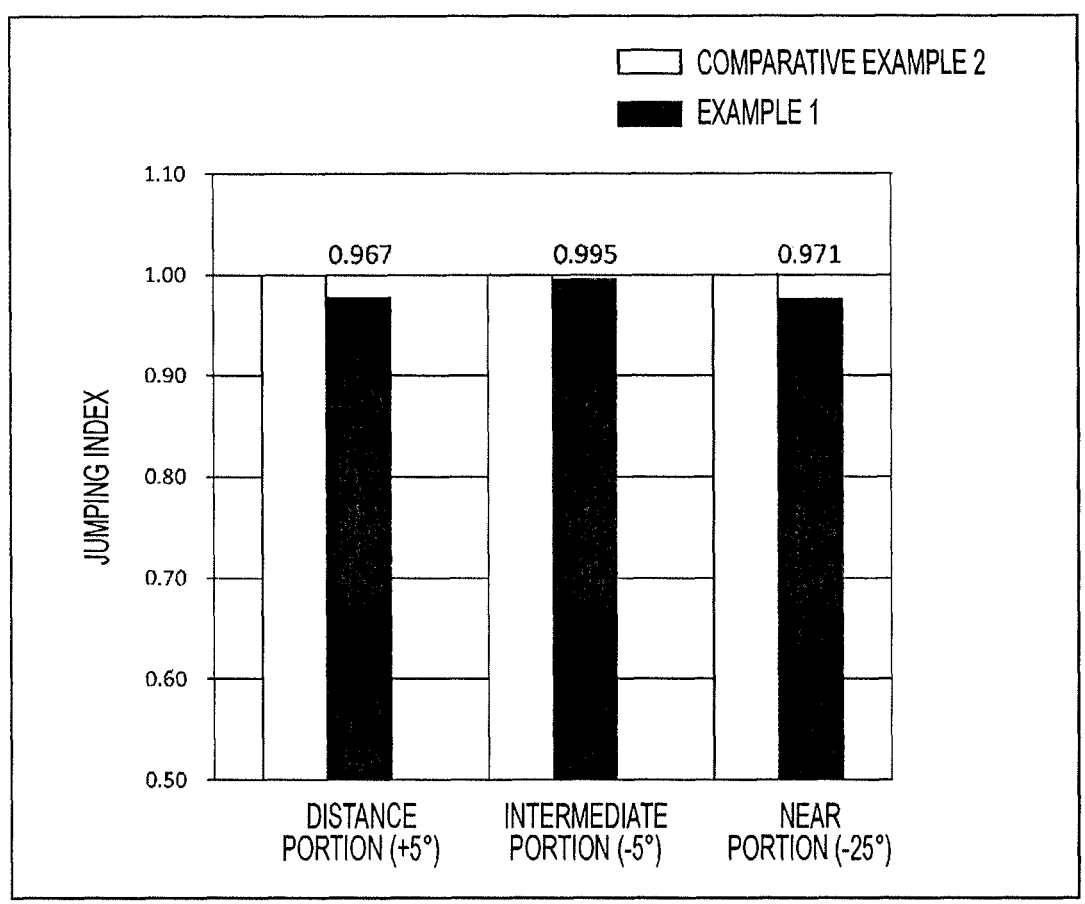
FIG. 8 is a graph showing respective jumping indexes of Example 1 and Comparative Example 2.
Figure 9:
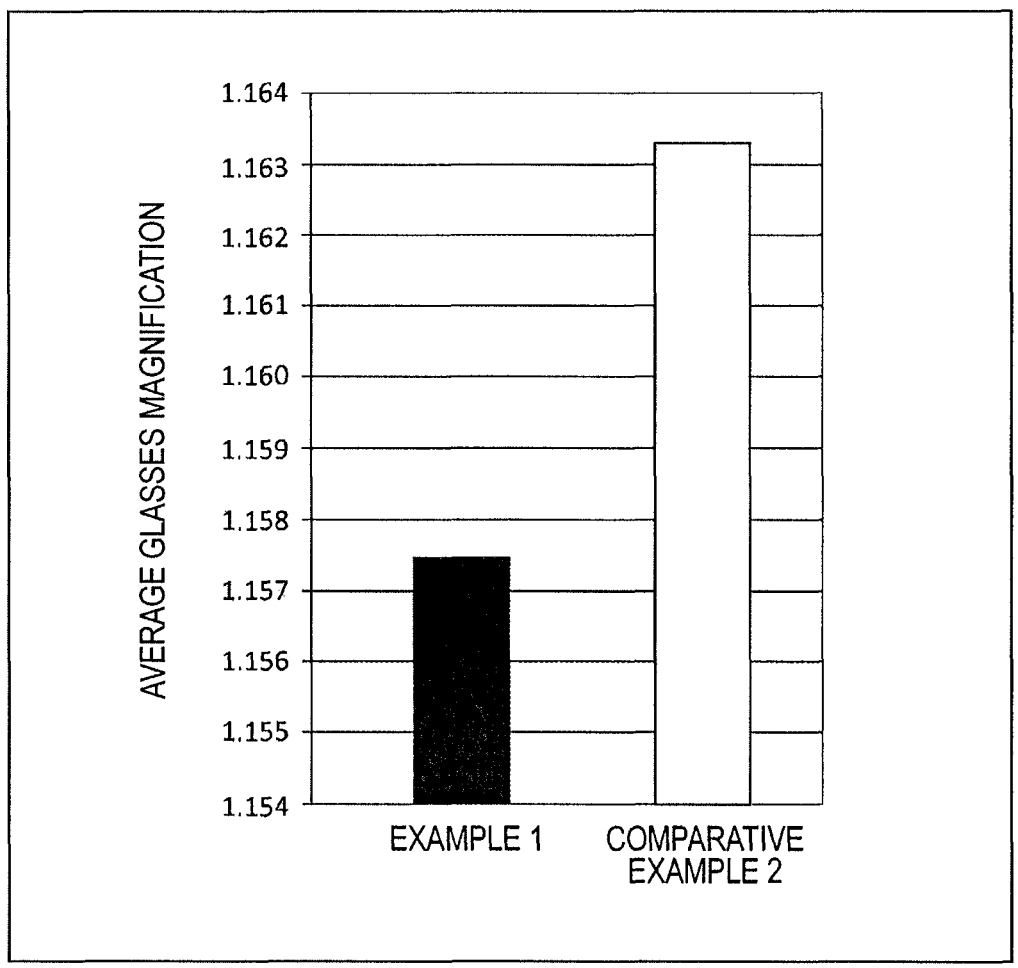
FIG. 9 is a graph showing respective average glasses magnifications of Example 1 and Comparative Example 2.
Figure 10:
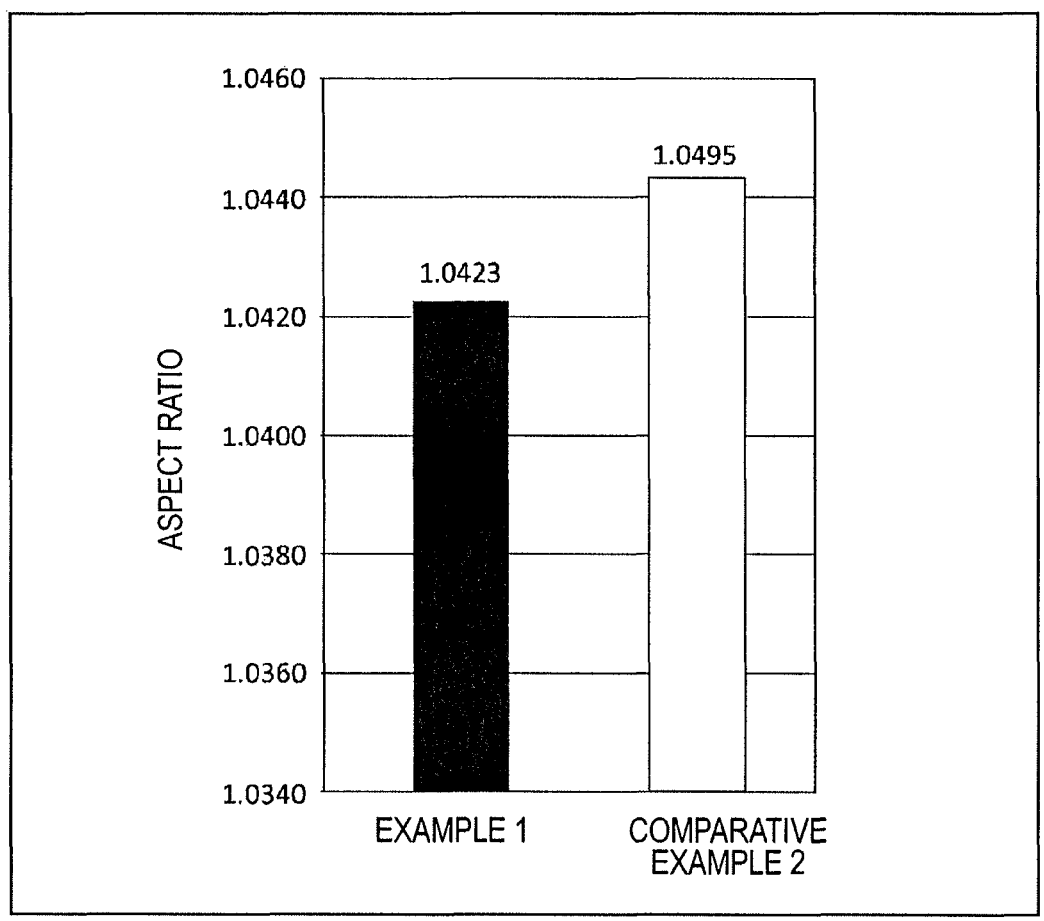
FIG. 10 is a graph showing respective aspect ratios of images of Example 1 and Comparative Example 2.
Figure 11:
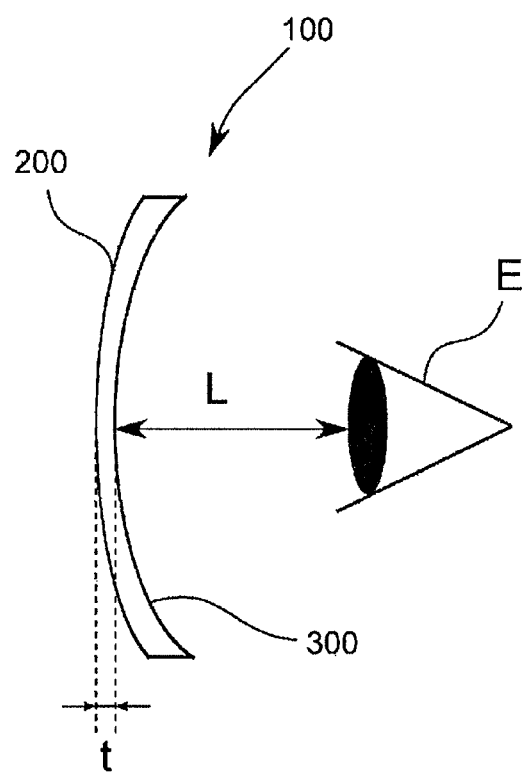
FIG. 11 shows magnification of a glasses lens.

After measuring the lens height of the designed progressive addition lens in a state in which a convex surface of the lens is arranged at a lower side, a jumping index (IDs), an average glasses magnification and the aspect ratio of the near portion are calculated. The jumping index (IDs) denotes a moving area of a vertical/horizontal lattice line, and denotes magnitude of deformation of the whole of a rectangle shape. The jumping index is normalized as the jumping index of Comparative Example 2 described below is 1. Further, the average glasses magnification is represented by the square of the product of a vertical magnification and a horizontal magnification. In the present example, it is preferable that the jumping index is small, the average glasses magnification is small, and the aspect ratio is close to 1. FIG. 7 shows the result of the lens height, FIG. 8 shows the result of the jumping index, FIG. 9 shows the result of the average glasses magnification, and FIG. 10 shows the result of the aspect ratio.

Comparative Example 1

In Comparative Example 1, similarly to Example 1, a both-sided progressive addition lens in which the distance power is +4.00 D (diopter) and the addition power is 2.00 D (diopter), and an atoric surface in which the curvature in the vertical direction and the curvature in the horizontal direction are different is arranged on the object-side surface, and the progressive surface is arranged on the eyeball-side surface, is designed. In this both-sided progressive addition lens, each of the object-side surface and the eyeball-side surface is formed in rotation asymmetry. Further, similarly to Example 1, the lens height of the both-sided progressive addition lens is measured in a state in which a convex surface of the lens is arranged at a lower side. FIG. 7 shows the result.

Referring to FIG. 7, in the progressive addition lens according to Example 1, the lens height in the vertical direction is the same as that in the horizontal direction, however in the progressive addition lens according to Comparative Example 1, the lens heights in the vertical direction is different from that in the horizontal direction. Accordingly, when a normal block ring having a constant height is used for the progressive addition lens according to Comparative Example 1, since the positional deviation of the lens is easily generated, a special block ring is needed, and therefore a cost is increased.

Comparative Example 2

An inner surface progressive addition lens in which the progressive surface having the progressive refractive effect designed in Example 1 is set to the eyeball-side surface and the object-side surface is formed by a spherical surface having the curvature of 9.063 is designed. With respect to the inner surface progressive addition lens, similarly to Example 1, the jumping index (IDs), the average glasses magnification, and the aspect ratio of the near portion are calculated. FIG. 8 shows the result of the jumping index, FIG. 9 shows the result of the average glasses magnification, and FIG. 10 shows the result of the aspect ratio.

Referring to FIG. 8, in each region of the distance portion, the intermediate portion and the near portion, the jumping index of the progressive addition lens according to Example 1 is smaller than the jumping index of the inner surface progressive lens according to Comparative Example 2. Further, according to FIG. 9, the average glasses magnification of the progressive addition lens according to Example 1 is smaller than the average glasses magnification of the inner surface progressive addition lens according to Comparative Example 2. Accordingly, when the same prescription is used, in the progressive addition lens according to the present invention, the magnification difference between the distance portion and the near portion can be reduced, and the jumping and the warping of images can be reduced.

Further, according to FIG. 10, the aspect ratio of the near portion of the progressive addition lens according to Example 1 is closer to 1 compared to that of the inner surface progressive addition lens according to Comparative Example 2, and therefore when seen through the near portion, the image is less expanded in the vertical direction and a less incongruous and comfortable field of vision can be obtained in the progressive addition lens according to Example 1.

Further, as one feature of the present invention, although it is a both-sided progressive lens, the object-side surface may be formed in a rotation symmetrical surface. A configuration in which this feature is added to the configuration described above is also encompassed by the scope of the present invention. On the other hand, this feature itself also forms the technical feature. An aspect including this feature is as below.

"A progressive addition lens including a near portion having a near power,
wherein each of an object-side surface and an eyeball-side surface is formed in an aspherical surface and has a progressive element,
the object-side surface is formed in rotational symmetry and has a first stable region including a rotation center, and a PV (Peak to Valley) value of a mean surface refractive power in the first stable region is 0.12 D or less."

REFERENCE SIGNS LIST 1 progressive addition lens
11 distance portion
12 near portion
13 intermediate portion
2 object-side surface
20 first stable region
21 curvature changing region
22 second stable region
23 rotation symmetrical aspherical region
3 eyeball-side surface

The invention claimed is:

1. A progressive addition lens formed for presbyopia with a positive distance power, the progressive addition lens comprising:
a near portion being arranged at a lower part of the progressive addition lens and having a power for viewing a near field;
a distance portion being arranged between an upper part and a center part of the progressive addition lens and having a power for viewing a distance field further than the near field; and
an intermediate portion connecting the distance portion and the near portion, wherein the progressive addition lens includes an aspherical object-side surface and an aspherical eyeball-side surface,
the object-side surface is formed in rotational symmetry with respect to a center point of the progressive addition lens,
the object-side surface includes a first stable region formed in rotational symmetry with respect to the center point and including the center point, and an aspherical region arranged outside of the first stable region so as to contact the first stable region and formed in rotational symmetry with respect to the center point such that the first stable region and the aspherical region are formed concentrically about the center point,
the aspherical region including a curvature changing region in contact with an outside of the first stable region, a curvature of the curvature changing region in a meridional direction from the center point toward an outer periphery of the object-side surface being smaller than a curvature in the meridional direction in the first stable region, the aspherical region further including a second stable region arranged outside of the curvature changing region so as to contact the curvature changing region and formed in rotational symmetry with respect to the center point, a curvature in the meridional direction in the second stable region being smaller than a curvature in a sagittal direction perpendicular to the meridional direction in the second stable region,
the first stable region has a first PV value (Peak to Valley meaning a maximum change) of a mean surface refractive power in the first stable region,
the second stable region has a second PV value (Peak to Valley meaning a maximum change) of a mean surface refractive power in the second stable region that is greater than the first PV value,
the first PV value is less than a first PV threshold value,
the curvature in the first stable region is constant to the extent that the PV value is less than or equal to the first PV threshold value,
the second PV value is less than a second PV threshold value, the second PV threshold value being greater than the first PV threshold value, and
the curvature in the second stable region in the meridional direction is constant to the extent that the PV value is less than or equal to the second PV threshold value,
the first PV threshold value is 0.12 D, and
the second PV threshold value is 0.25 D.

2. The progressive addition lens according to claim 1, wherein one of the curvature in the meridional direction in the curvature changing region and a curvature in a sagittal direction perpendicular to the meridional direction in the curvature changing region is asymptotically reduced at points along a line in the meridional direction as a distance from the center point increases.

3. The progressive addition lens according to claim 1, wherein the curvature in the meridional direction in the curvature changing region is smaller than a curvature in a sagittal direction perpendicular to the meridional direction in the curvature changing region.

4. The progressive addition lens according to claim 1, wherein the eyeball-side surface includes a region opposite the curvature changing region that negates a change in refractive power of the curvature changing region.

5. The progressive addition lens according to claim 1, wherein a distance power measuring point is arranged in the first stable region.

6. The progressive addition lens according to claim 5, wherein a near power measuring point is arranged in the curvature changing region or the second stable region.

7. The progressive addition lens according to claim 1, wherein a near power measuring point is arranged in the first stable region.

8. The progressive addition lens according to claim 7, wherein a distance power measuring point is arranged in the curvature changing region or the second stable region.

* * * * *